(12) United States Patent
Kang

(10) Patent No.: US 9,771,843 B2
(45) Date of Patent: Sep. 26, 2017

(54) MUFFLER INTEGRATED TYPE GASOLINE PARTICULATE FILTER

(71) Applicant: HYUNDAI MOTOR COMPANY, Seoul (KR)

(72) Inventor: Chun Yong Kang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/175,646

(22) Filed: Jun. 7, 2016

(65) Prior Publication Data

US 2017/0122160 A1    May 4, 2017

(30) Foreign Application Priority Data

Nov. 4, 2015 (KR) .................. 10 2015 0154167

(51) Int. Cl.
*F01N 3/22*     (2006.01)
*F01N 3/033*    (2006.01)
*F01N 3/022*    (2006.01)

(52) U.S. Cl.
CPC .......... *F01N 3/0335* (2013.01); *F01N 3/022* (2013.01); *F01N 2230/02* (2013.01); *F01N 2330/34* (2013.01); *F01N 2330/38* (2013.01)

(58) Field of Classification Search
CPC .... F01N 3/0335; F01N 3/022; F01N 2230/02; F01N 2230/34; F01N 2230/38
USPC ........................................ 181/231
See application file for complete search history.

(56) References Cited

U.S. PATENT DOCUMENTS

| 4,033,428 A | * | 7/1977 | Wennerstrom ...... F04B 39/0055 181/230 |
| 4,074,975 A | * | 2/1978 | Tokura .................... B04C 9/00 181/272 |
| 5,792,247 A | * | 8/1998 | Gillingham ........... F02M 35/14 181/231 |

(Continued)

FOREIGN PATENT DOCUMENTS

| DE | 102007051534 A1 * | 4/2009 | ............ B22F 3/1112 |
| EP | 1486248 A1 | 12/2004 | |
| EP | 1522686 | 4/2005 | |

(Continued)

OTHER PUBLICATIONS

Extended European Search Report issued in Application No. 16173084.1 dated Nov. 18, 2016.

(Continued)

*Primary Examiner* — Forrest M Phillips
(74) *Attorney, Agent, or Firm* — McDermott Will & Emery LLP

(57) ABSTRACT

A muffler integrated type gasoline particulate filter includes a filter having first and second surfaces and first channels and second channels alternately arranged, each of the first channels being closed at the second surface and each of the second channels being closed at the first surface, the filter collecting exhaust gas particulates when exhaust gas passes through a wall surface disposed between the first and second channels. The muffler integrated type gasoline particulate filter further includes protruding walls formed on an inner wall surface of each of the first and second channels in a longitudinal direction thereof. The protruding walls reduce noise of the exhaust gas flowing along each of the first and second channels.

8 Claims, 4 Drawing Sheets

(56) References Cited

U.S. PATENT DOCUMENTS 7,141,101 B2 * 11/2006 Amann .............. B01D 46/0023
181/229
2011/0030346 A1 * 2/2011 Neubauer ............ B01D 53/944
60/274

FOREIGN PATENT DOCUMENTS

| EP | 1559882 A1 | 8/2005 |
| FR | 2923532 A3 | 5/2009 |
| JP | 2000-337127 A | 12/2000 |
| JP | 2003-254035 A | 9/2003 |
| KR | 10-1998-0703817 A | 12/1998 |
| KR | 10-2004-0031263 A | 4/2004 |
| KR | 10-0708964 B1 | 4/2007 |
| KR | 10-0727182 B1 | 6/2007 |
| WO | 03/068364 A1 | 8/2003 |
| WO | 2005/121513 A1 | 12/2005 |

OTHER PUBLICATIONS

Korean Office Action issued in Application No. 10-2015-0154167 dated Dec. 19, 2016.

* cited by examiner

[FIG. 1]
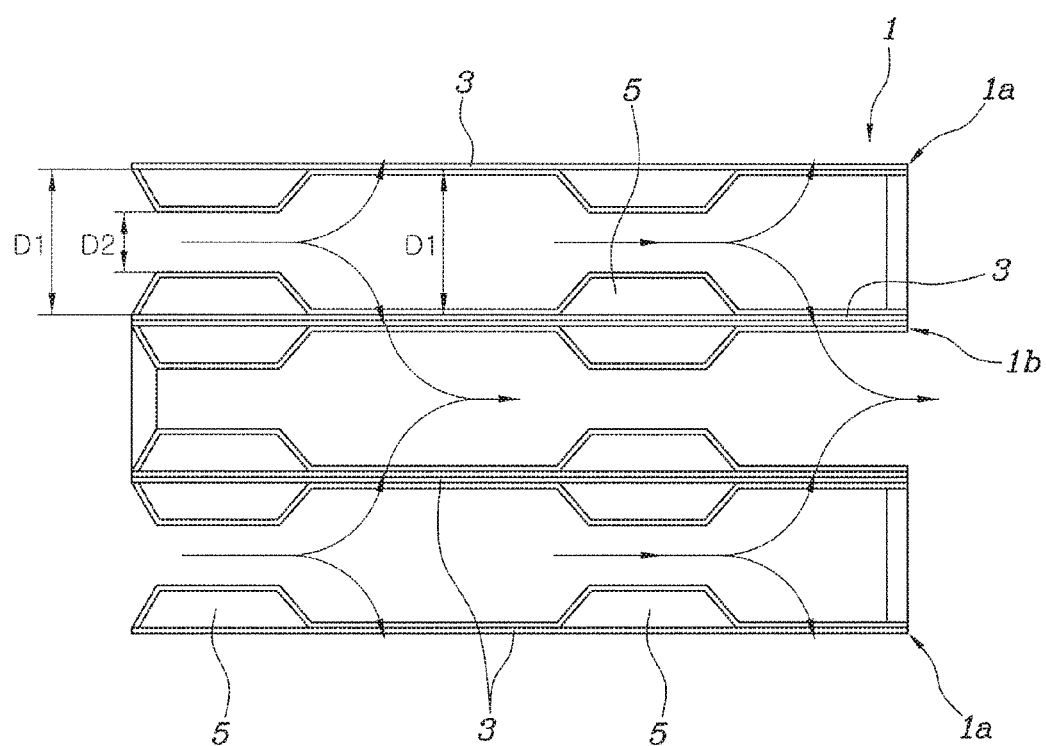

[FIG. 2]
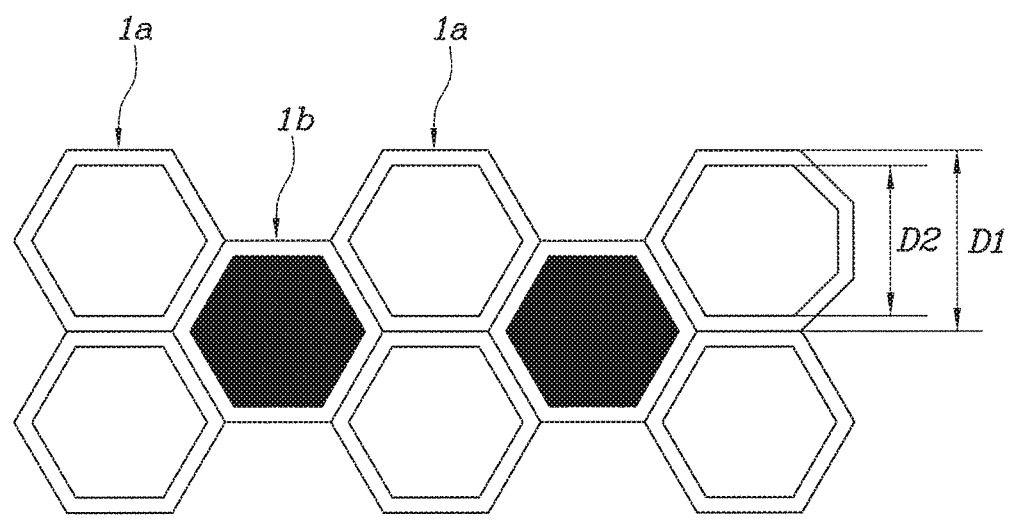

[FIG. 3]
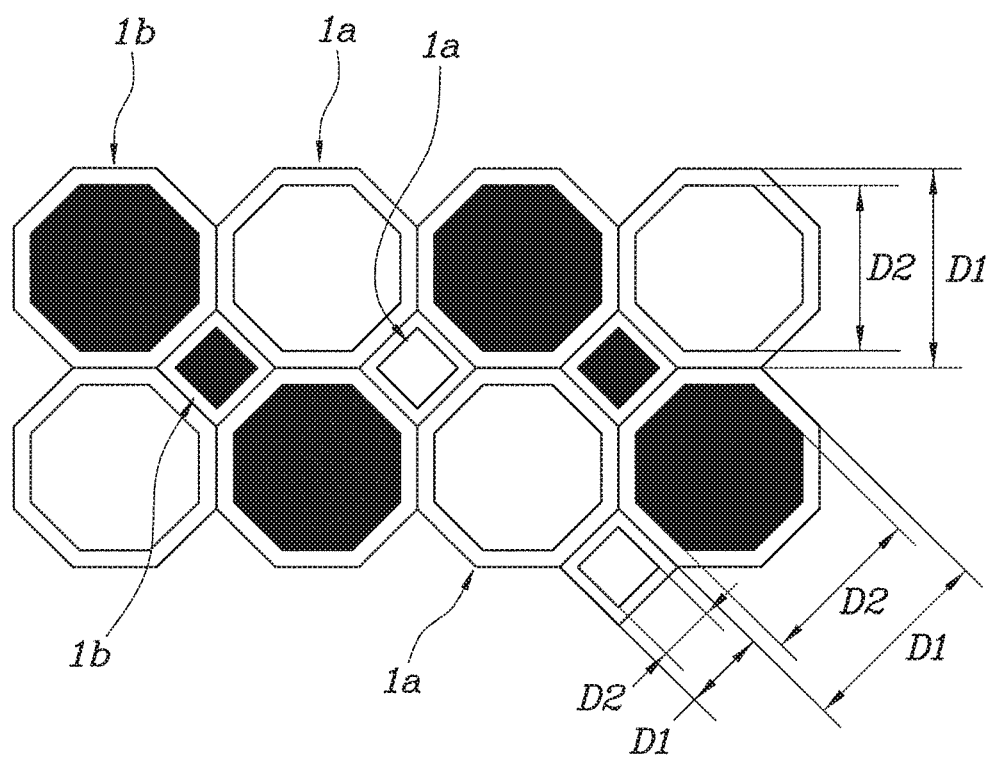

[FIG. 4]
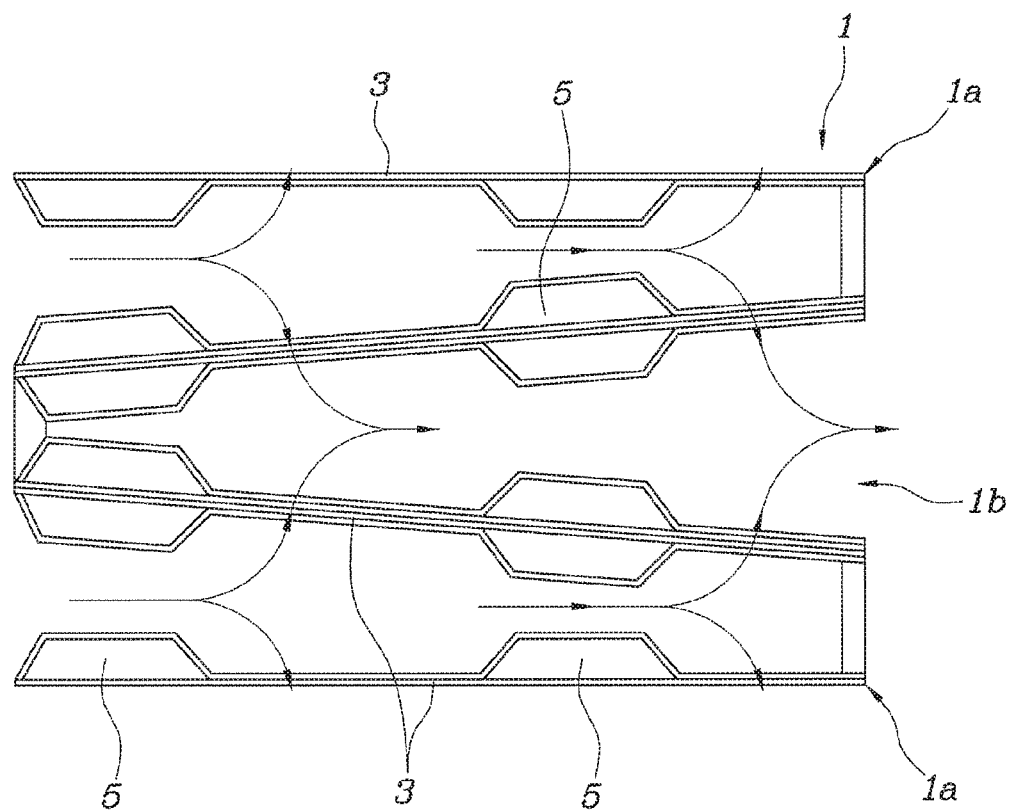

MUFFLER INTEGRATED TYPE GASOLINE PARTICULATE FILTER

CROSS REFERENCE TO RELATED APPLICATION

The present application claims the benefit of priority to Korean Patent Application No. 10-2015-0154167, filed on Nov. 4, 2015 with the Korean Intellectual Property Office, the entirety of which is incorporated herein for all purposes by reference.

TECHNICAL FIELD

The present disclosure generally relates to a gasoline particulate filter. More particularly, the present disclosure relates to a muffler integrated type gasoline particulate filter that can realize the function of a gasoline particulate filter and a muffler by changing the inner configuration of the filter.

BACKGROUND

In recent years, a system for a gasoline powered vehicle has been developed that can obtain high power with a small quantity of fuel by applying engine downsizing, a turbosupercharger, and a gasoline direct injection system to the gasoline powered vehicle.

However, since high pressure injection of fuel is performed in a gasoline direct injection system, a liquid fuel film formed on a wall surface in a combustion chamber and on an upper part of a piston, and air and the fuel are unevenly mixed, which leads to incomplete combustion and thus emission of particulate matter.

When inhaled, the particulate matter may cause inflammatory responses such as bronchitis and pulmonary emphysema. In particular, as studies show that the particulate matter includes carcinogens, Euro5, which is a European vehicle emission standard, was created to regulate the limits on particulate emissions from diesel engines. Further, emissions ($6\times10^{11}$ N/km) in gasoline vehicles are also going to be regulated under the regulation of Euro6-c.

Accordingly, since existing gasoline vehicle include a gasoline direct injection system that discharges particulate matter to a degree that it does not meet the regulations of Euro6-c, mounting a gasoline particulate filter onto an existing gasoline vehicle so as to meet the Euro6-c standards is under development.

However, mounting a gasoline particulate filter onto an existing gasoline vehicle requires changing the existing exhaust system, which leads to a rise in the manufacturing cost of the existing gasoline vehicle.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art, and the present disclosure is intended to propose a muffler integrated type gasoline particulate filter that realizes the function of a gasoline particulate filter and a muffler by changing an inner configuration of the filter.

In order to achieve the above object, according to one aspect of the present disclosure, there 15 provided a muffler integrated type gasoline particulate filter, the filter including: a filter having first and second surfaces and first channels and second channels alternately arranged, each of the first channels being closed at the second surface and each of the second channels being closed at the first surface, the filter collecting exhaust gas particulates while exhaust gas passes through a wall surface disposed between the first and second channels; and protruding walls formed on an inner wall surface of each of the first and second channels in longitudinal direction thereof. The protruding walls reduce noise of the exhaust gas flowing along each of the first and second channels.

Each of the protruding walls may protrude inwardly from the inner wall surface of each of the first and second channels.

The filter may further include: filtration parts provided on the wall surface of each of the first and second channels, the filtration parts having air holes and allowing the exhaust gas to pass therethrough, wherein the filtration parts and the protruding walls may be alternately arranged in the longitudinal direction of each of the first and second channels.

The cross-sectional area of a path defined by each of the protruding walls may be smaller than the cross-sectional area of a path defined by each of the filtration parts.

The cross-sectional area of an entrance side of a path defined by each of the protruding walls may be gradually reduced in a direction toward a middle part of the protruding wall, and the cross-sectional area of an exit side of the path defined by each of the protruding walls may be gradually increased in a direction outward from the middle part of the protruding wall.

The cross-section of the path defined by each of the protruding walls may be a polygonal shape.

The cross-sectional shape of the path defined by each of the protruding walls may be the same as the cross-sectional shape of a path defined by each of the filtration parts.

The cross-sectional area of each of the first channels closed at the second surface may be gradually decreased in a direction toward the second surface, and the cross-sectional area of each of the second channels closed at the first surface may be gradually increased in a direction toward the second surface.

The cross-section of the path defined by each of the protruding walls may be a hexagonal shape.

The cross-section of the path defined by each of the protruding walls may be an octagonal shape or a tetragonal shape.

By means of the above-mentioned a technical solution, a muffler integrated type gasoline particulate filter of the present invention realizes the filtering function of a gasoline particulate filter and, at the same time, the function of a muffler by means of configuration of protruding walls provided in the filter. Accordingly, a rise in the manufacturing cost of an existing gasoline vehicle due to installation of the gasoline particulate filter can be minimized.

BRIEF DESCRIPTION OF THE DRAWINGS

The above and other objects, features and other advantages of the present disclosure will be more clearly understood from the following detailed description when taken in conjunction with the accompanying drawings, in which:

FIG. 1 is a view showing a flow and a noise reduction structure of exhaust gas of a muffler integrated type gasoline particulate filter according to an exemplary embodiment in the present disclosure;

FIGS. 2 and 3 are views showing structures of cross-sections of paths defined by hexagonal, octagonal and tetragonal-shaped protruding walls of the muffler integrated type gasoline particulate filter according to exemplary embodiments in the present disclosure; and FIG. 4 is a view showing a configuration of first and second channels having respective slant surfaces of a muffler integrated type gasoline particulate filter according to another exemplary embodiment in the present disclosure.

DETAILED DESCRIPTION

Hereinbelow, exemplary embodiments of the present invention will be described in detail with reference to the accompanying drawings. Throughout the drawings, the same reference numerals will refer to the same or like parts.

A muffler integrated type gasoline particulate filter according to an exemplary embodiment includes: a filter 1, and protruding walls 5.

Referring to FIGS. 1 to 3, the filter 1 has first and second surfaces and first channels 1a and second channels 1b alternately arranged, each of the first channels 1a being closed at the second surface and each of the second channels 1b being closed at the first surface, the filter 1 collecting exhaust gas particulates while exhaust gas passes through a wall surface disposed between the first and second channels 1a and 1b.

For example, the first channels 1a and the second channels 1b may be alternately arranged having a honeycomb structure. In this case, the entrance of each of the first channels 1a and the exit of each of the second channels 1b may be closed by plugs.

In particular, filtration parts 3 are provided on the wall surface of each of the first channels 1a and the second channels 1b, the filtration parts 3 having air holes and allowing exhaust gas to pass therethrough.

That is, the filter 1 can be configured to have the same structure as that of a wall flow of a diesel particulate filter (DPF) mounted to a diesel engine powered vehicle, and thus the filter 1 can collect the exhaust gas particulates in the same way that a DPF does.

For example, when the exhaust gas is introduced through the first channel 1a into the filter 1, the exhaust gas passes through the filtration parts 3 formed on the wall surface of each of the first channels 1a and the second channels 1b, and is introduced into the second channel 1b. Accordingly, the exhaust gas particulates (particulate matter) are collected in the air holes of the filtration parts 3, and the exhaust gas cleared of the exhaust gas particulates is discharged from the filter 1 through the second channel 1b. Periodic regeneration of the gasoline particulate filter may be required to prevent the filter 1 from becoming blocked due to the collected exhaust gas particulates.

The protruding walls 5 are formed on an inner wall surface of each of the first and second channels 1a and 1b in a longitudinal direction thereof, and the protruding walls 5 can reduce noise of the exhaust gas flowing along each of the first and second channels 1a and 1b. Each of the protruding walls 5 may be formed by protruding inwardly from the inner wall surface of each of the first and second channels 1a and 1b.

For example, the filtration parts 3 and the protruding walls 5 may be alternately arranged in the longitudinal direction of each of the first and second channels 1a and 1b.

In particular, the cross-sectional area of a path D2 defined by each of the protruding walls 5 may be smaller than the cross-sectional area of a path D1 defined by each of the filtration parts 3.

According to the above-mentioned configuration, when exhaust gas of high temperature and high pressure discharged from an engine passes through the paths D1 and D2 defined by the filtration parts 3 and the protruding walls 5 respectively, the exhaust gas gradually expands, and when introduced into the path D2 defined by the protruding walls 5, sound waves of progressive waves of the exhaust gas are repeatedly decreased by interference of reflexive waves produced from the protruding walls 5, which reduces the noise produced by the discharge of the exhaust gas.

Accordingly, the muffler integrated type gasoline particulate filter of the present exemplary embodiment realizes the filtering function of the gasoline particulate filter and at the same time, the function of a muffler by means of configuration of the protruding walls 5 provided in the filter 1. Accordingly, rise of manufacturing cost of the existing gasoline vehicle due to installation of the gasoline particulate filter can be minimized.

Furthermore, according to an embodiment of the present invention, the cross-sectional area of an entrance side of the path D2 defined by each of the protruding walls 5 may be gradually reduced in a direction toward a middle part of the protruding wall 5. Further, the cross-sectional area of an exit side of the path D2 defined by each of the protruding walls 5 may be gradually increased in a direction outward from the middle part of the protruding wall 5.

As shown in FIGS. 2 and 3, the cross-section of the path D2 defined by each of the protruding walls 5 and the cross-section of the path D1 defined by each of the filtration parts may be polygonal shapes having, for example, hexagonal shapes, octagonal shapes, or tetragonal shapes. For example, as shown in FIG. 2, the cross-section of the paths D1 and D2 may be a hexagonal shape. Alternatively, as shown FIG. 3, the cross-section of the paths D1 and D2 may be a combination of octagonal and tetragonal shapes.

The cross-sectional shape of the path D2 defined by each of the protruding walls 5 may be the same as the cross-sectional shape of the path D1 defined by each of the filtration parts 3.

Another important consideration in mounting a gasoline particulate filter is back pressure. The path D1 is required to be narrow so as to increase filtration efficiency of the particulate matter. However, this increases the back pressure, which leads to lower engine power and lower fuel efficiency. When the path D1 is widened, however, the filtration efficiency decreases. Accordingly, it is beneficial to decrease the back pressure by decreasing resistance to the back pressure of the exhaust gas.

To decrease the nack pressure, the cross-sectional area of the entrance side of the path D2 defined by each of the protruding walls 5 may be gradually reduced in a flow direction of the exhaust gas, and the cross-sectional area of the exit side of the path D2 defined by each of the protruding walls 5 may be gradually increased in the flow direction of the exhaust gas. Additionally, a shape of the path D2 of the protruding walls 5 may be configured to be a polygonal shape (a hexagon to a dodecagon) approaching a circle so as to minimize a flow resistance of the exhaust gas.

In the exemplary embodiment shown in FIG. 1, the first channels 1a and the second channels 1b are configured to be parallel to each other, and thus the entrance side and the exit side of each of the first channel 1a and the second channel 1b have the same cross-sectional areas. However, according to another exemplary embodiment in the present disclosure, as shown in FIG. 4, each of the first channels 1a and the second channels 1b may be configured to form a slant surface relative to a neighboring channel so that the entrance side and the exit side of each of the first channels 1a and the second channels 1b have different cross-sectional areas.

For example, the cross-sectional area of each of the first channels 1a open at the entrance thereof may be gradually reduced in a direction toward an exit of the first channel relative to the flow direction of the exhaust gas, and the cross-sectional area of each of the second channels 1b closed at the entrance thereof may be gradually increased in a direction toward an exit of the second channel relative to the flow direction of the exhaust gas.

Accordingly, flow of the exhaust gas flowing along the first channel 1a is relatively delayed, which increases the filtration efficiency of the particulate matter, and flow of the exhaust gas flowing along the second channel 1b is relatively smooth, which decreases the resistance to the back pressure.

As noted above, the muffler integrated type gasoline particulate filter of the present disclosure realizes the filtering function of a gasoline particulate filter, and at the same time, the function of a muffler by means of configuration of the protruding walls 5 provided in the filter 1. Accordingly, a rise in the manufacturing cost of the existing gasoline vehicle due to installation of a gasoline particulate filter can be minimized.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A muffler integrated type gasoline particulate filter, the filter comprising:
   a filter having first and second surfaces, and first channels and second channels alternately arranged, each of the first channels being closed at the second surface and each of the second channels being closed at the first surface, the filter collecting exhaust gas particulates when exhaust gas passes through a wall surface disposed between the first and second channels;
   protruding walls formed on an inner wall surface of each of the first and second channels in a longitudinal direction of each of the first and second channels; and
   filtration parts provided on the wall surface of each of the first and second channels, the filtration parts having air holes and allowing the exhaust gas to pass through the air holes,
   wherein the filtration parts and the protruding walls are alternately arranged in the longitudinal direction of each of the first and second channels,
   wherein the protruding walls reduce noise of the exhaust gas flowing along each of the first and second channels,
   wherein each of the protruding walls protrudes inwardly from the inner wall surface of each of the first and second channels, and
   wherein a cross-sectional area of a first path defined by each of the protruding walls is smaller than a cross-sectional area of a second path defined by each of the filtration parts.

2. The filter of claim 1, wherein a cross-sectional area of an entrance side of the first path is gradually reduced in a direction toward a middle part of the protruding wall, and a cross-sectional area of an exit side of the first path is gradually increased in a direction outward from the middle part of the protruding wall.

3. The filter of claim 2, wherein the cross-section of the first path has a polygonal shape.

4. The filter of claim 2, wherein a cross-sectional shape of the first path is the same as a cross-sectional shape of the second path.

5. The filter of claim 1, wherein a cross-sectional area of each of the first channels closed at the second surface is gradually decreased in a direction toward the second surface, and a cross-sectional area of each of the second channels closed at the first surface is gradually increased in a direction toward the second surface.

6. The filter of claim 3, wherein the cross-section of the first path has a hexagonal shape.

7. The filter of claim 3, wherein the cross-section of the first path has an octagonal shape or a tetragonal shape.

8. The filter of claim 1, wherein
   a cross-section of entrance and exit sides of each of the first channels has an octagonal shape or tetragonal shape,
   a cross-section of entrance and exit sides of each of the second channels has an octagonal shape or tetragonal shape,
   an outer face having the octagonal shape of each of the first channels surface-to-surface contacts with an outer face having the octagonal shape of the second channel, while the first and second channels having the cross-section of the octagonal shape are alternatively arranged in a honeycomb structure,
   an outer face having the tetragonal shape of the first channel or second channel contacts with one other outer face having the octagonal shape of the first and the second channels, while the first and second channels having the octagonal shape surface-to-surface contact each other, and
   the first and second channels having the cross-section of the tetragonal shape are alternatively arranged.

* * * * *